(12) United States Patent
Al-Garni et al.

(10) Patent No.: US 9,476,601 B2
(45) Date of Patent: Oct. 25, 2016

(54) SOLAR-POWERED AIR CONDITIONING SYSTEM

(71) Applicant: KING FAHD UNIVERSITY OF PETROLEUM AND MINERALS, Dhahran (SA)

(72) Inventors: Ahmed Z. Al-Garni, Dhahran (SA); Wael G. Abdelrahman, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 272 days.

(21) Appl. No.: 14/139,751

(22) Filed: Dec. 23, 2013

(65) Prior Publication Data

US 2015/0176873 A1  Jun. 25, 2015

(51) Int. Cl.
| | | |
|---|---|---|
| *F25B 27/00* | (2006.01) |
| *F24F 5/00* | (2006.01) |
| *F24F 6/00* | (2006.01) |
| *F24F 13/22* | (2006.01) |
| *F24F 1/00* | (2011.01) |
| *F24F 1/42* | (2011.01) |
| *F24F 6/12* | (2006.01) |
| *F24F 6/02* | (2006.01) |
| *F24F 6/14* | (2006.01) |

(52) U.S. Cl.
CPC ............... *F24F 5/0035* (2013.01); *F24F 1/42* (2013.01); *F24F 6/02* (2013.01); *F24F 6/12* (2013.01); *F24F 13/222* (2013.01); *F24F 2001/0085* (2013.01); *F24F 2001/0088* (2013.01); *F24F 2001/0092* (2013.01); *F24F 2005/0067* (2013.01); *F24F 2006/008* (2013.01); *F24F 2006/143* (2013.01); *F24F 2013/225* (2013.01); *Y02B 10/20* (2013.01); *Y02B 10/24* (2013.01)

(58) Field of Classification Search
CPC ........... F24F 5/0035; F24F 2005/0067; F24F 2006/008; F24F 6/02; F24F 6/12; F24F 2006/143; F24F 2001/0085; F24F 2001/0088; F24F 2001/092; F24F 1/42; F24F 13/222; F24F 2013/225
USPC ....................................................... 62/235.1
See application file for complete search history.

(56) References Cited

U.S. PATENT DOCUMENTS

| | | | | |
|---|---|---|---|---|
| 2,766,027 A | * | 10/1956 | Herr | .......................... F24F 6/16 126/113 |
| 3,408,913 A | | 11/1968 | Kueffner | |
| 4,858,397 A | * | 8/1989 | Lantz | ...................... E04B 7/102 52/63 |
| 7,856,843 B2 | | 12/2010 | Enis et al. | |
| 7,927,406 B2 | | 4/2011 | Takeuchi | |
| 2008/0041083 A1 | * | 2/2008 | Al-Garni | ................ F24F 5/0035 62/235.1 |

(Continued)

*Primary Examiner* — Ryan J Walters
*Assistant Examiner* — Steve Tanenbaum
(74) *Attorney, Agent, or Firm* — Richard C. Litman

(57) ABSTRACT

The solar powered evaporative air conditioning system is especially adapted for use in areas wherein the climate conditions are hot and dry. A tunnel-shaped, light weight, inflatable structure is employed to enclose a space to be cooled, the space having a floor or ground area enclosed by the structure. Solar panels are disposed on the roof of the structure to generate electrical energy to power the air conditioning system. The inflatable structure is designed with a roof having a hyperbolic paraboloidal configuration such that a narrow cross-sectional area or throat area is formed between the roof and ground.

4 Claims, 4 Drawing Sheets

(56) References Cited

U.S. PATENT DOCUMENTS

| | | | |
|---|---|---|---|
| 2008/0157409 A1* | 7/2008 | Reens | F24F 6/12 261/118 |
| 2012/0014902 A1* | 1/2012 | Carty | A01N 59/00 424/76.2 |
| 2012/0025408 A1* | 2/2012 | Wong | F24F 6/12 261/81 |
| 2013/0255670 A1* | 10/2013 | Ott | A61M 13/003 128/200.14 |
| 2015/0069143 A1* | 3/2015 | Yen | B05B 17/0646 239/102.2 |

* cited by examiner

SOLAR-POWERED AIR CONDITIONING SYSTEM

BACKGROUND OF THE INVENTION

1. Field of the Invention

The present invention generally relates to air conditioning apparatus, and particularly to a solar-powered air conditioning system utilized to cool an inflatable structure and suitable for use in arid climates.

2. Description of the Related Art

A variety of air conditioning systems are available for commercial and industrial cooling. The most utilized systems include a compressor that pumps a liquid refrigerant through an array of cooling coils in a closed cycle. A blower passes warm air over the cooling coils. Thermal energy is extracted from the warm air, causing the liquid refrigerant to gasify, thereby cooling the air. The cooled air is routed to a space to be cooled, and the refrigerant is recycled to the compressor for reconversion to a liquid state. The above-described systems are relatively expensive to operate in that they require a large amount of external energy, usually in the form of electricity, and the use of costly refrigerants. The systems also often employ chlorofluorohydrocarbon refrigerants which are harmful to the environment and which have been banned for future use in some jurisdictions.

Evaporative cooling systems comprise another form of air conditioning apparatus. Such systems work best if the air to be conditioned is hot and dry. In its simplest form, a stream of hot, dry air is brought into direct contact with cooler water droplets. The hot air and water attempt to reach equilibrium status so that heat from the air is transferred to the water, thereby cooling the stream of air. Evaporative cooling systems do not require the use of expensive refrigerants and complex pumping systems. Only enough external energy to move the air into contact with the water droplets and into the space to be cooled is required. Such systems would be ideal for use in regions that are hot and arid, such as countries of the Middle East and areas of the southwestern United States. It would be a boon to the air conditioning industry if an effective evaporative air conditioning system would be developed that would also generate its external power requirements. Thus, a solar-powered air conditioning system solving the aforementioned problems is desired.

SUMMARY OF THE INVENTION

The solar-powered air conditioning system is expressly adapted for use in areas wherein climatic conditions are hot and dry. A tunnel-shaped, lightweight, inflatable structure is employed to enclose a space to be cooled, the space having a floor or ground area enclosed by the structure. Solar panels are disposed on the roof of the structure to generate electrical energy to power the air conditioning system. The inflatable structure is designed with a roof having a hyperbolic paraboloid configuration (see, e.g., U.S. Pat. No. 4,858,397). The roof presents a convergent-divergent profile such that a narrow cross-sectional area or throat area is formed by the roof in the area where the roof is closest to the ground. A fan or the like delivers an ambient air stream through the roof at the throat area. A water delivery system introduces water droplets into the forced air stream at the throat area. Evaporation of the water droplets lowers the temperature of the air through evaporative cooling. The water delivery system can include an atomizer grill or fan blades with orifices therein.

Accordingly, the invention presents an inflatable structure for enclosing an open area that is provided with an evaporative cooling system. The cooling system is powered by energy obtained from solar panels disposed on the outer surface of the roof of the structure. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
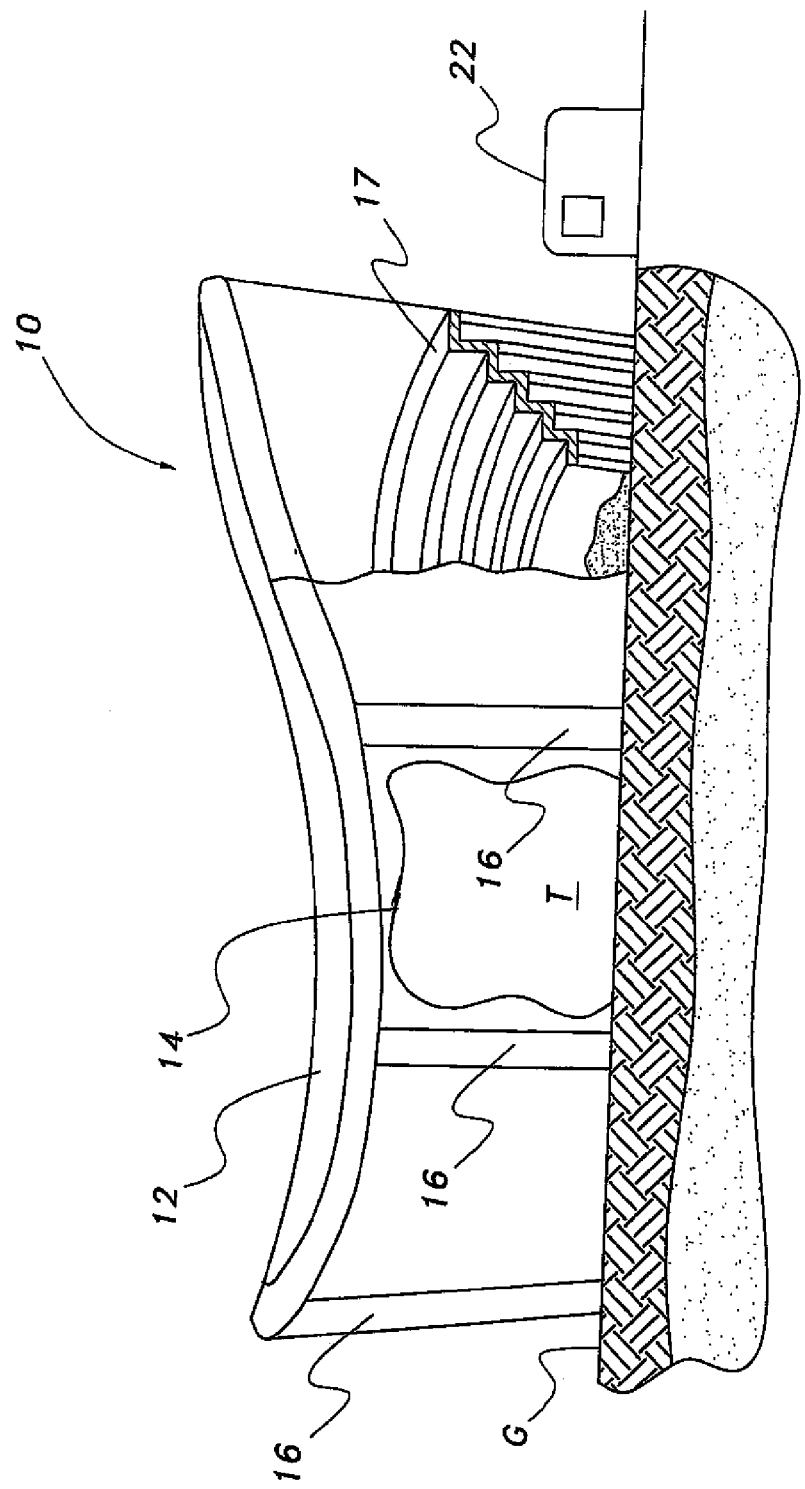
FIG. 1 is a diagrammatic environmental front view of an inflatable structure utilizing a solar powered air conditioning system according to the present invention, the structure being broken away and partially in section.
Figure 2:
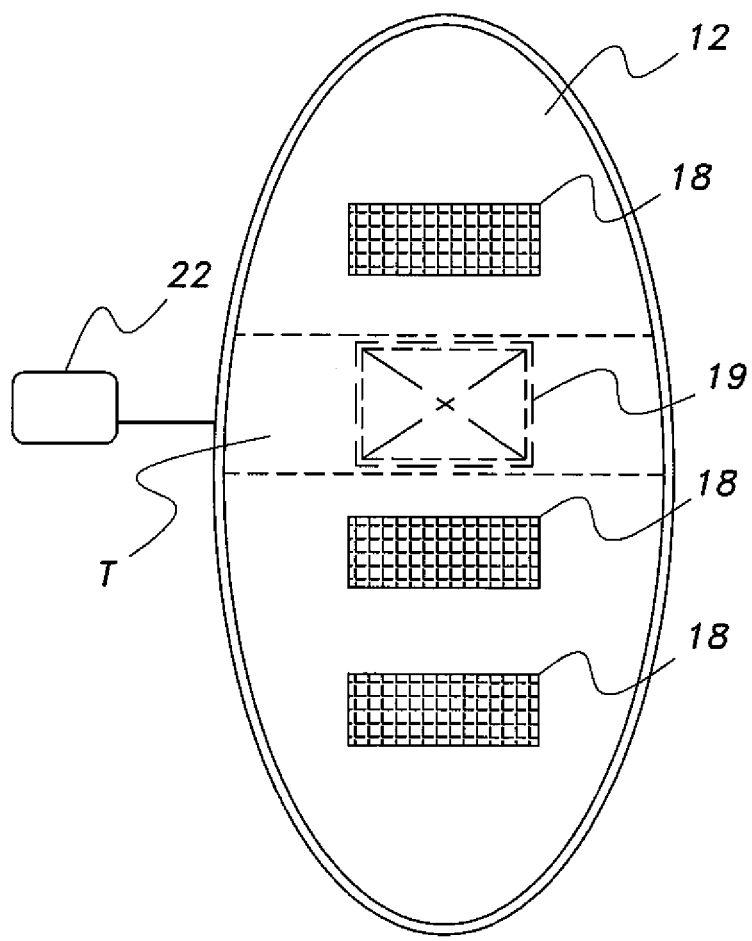
FIG. 2 is a diagrammatic top view of the inflatable structure of FIG. 1.

Referring to FIGS. 1-4, an inflatable, evaporative air conditioned structure incorporating a solar-powered air conditioning system is generally indicated at 10. The structure comprises a roof 12 of hyperbolic, paraboloid configuration. The roof 12 and wall(s) 14 of the structure are fabricated from flexible, functionally graded material providing thermal insulation. Support posts 16 are extensible. The roof 12 and wall(s) 14 are inflatable so that the structure 10 can be erected over an open ground area G to form an enclosed arena or the like to house spectators for crowd events (sports, religious, entertainment, etc.) therein. When inflated, a seating area 17 is formed along the wall(s) 14. As shown in FIG. 2, a plurality of solar panels 18 is disposed on the outer surface of the roof 12. The panels 18 may generate electrical energy to power a pump (not shown) for inflating the structure 10. The solar panels 18 also power the elements of the water delivery system, as explained below. Because of the roof's profile, a narrow cross-sectional area or throat area T is formed between the roof 12 and ground G in the area where the roof 12 is closest to the ground G. Forced air and water droplets are introduced via a delivery system 19 through the roof 12 in this area. Evaporation of the water droplets, accelerated by the fast-moving air through the throat area T, lowers the temperature of the air.

Figure 3:
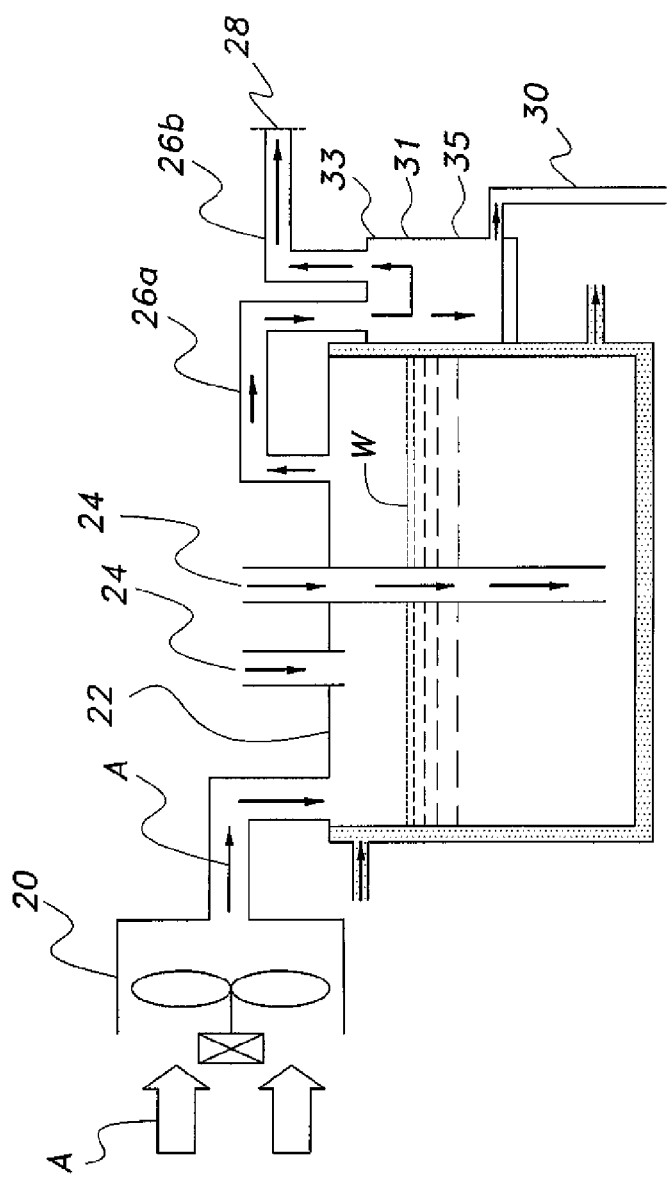
FIG. 3 is a diagrammatic front view in section of the water delivery system of the solar-powered air conditioning system of FIG. 1.

A first embodiment of a water delivery system 19 is shown in FIG. 3. A solar-powered fan 20 delivers a stream of air A to a reservoir 22. The reservoir 22 is filled with water W. The water W may be supplied from any conventional source. If salty, the water W should be treated in a desalination unit before use. The fan 20 lowers air pressure at the surface of the water W, thereby increasing the rate of evaporation from the reservoir 22. Ventilation and water delivery pipes 24 are provided for the reservoir 22. A mixture of air and water droplets exits the reservoir 22 via a first conduit 26*a* and enters auxiliary chamber 31. As shown in FIG. 3, auxiliary chamber 31 includes an upper portion 33 and a lower portion 35. First conduit 26*a* leads into the upper portion 33 of auxiliary chamber 31 and a second conduit 26b leads out of upper portion 33, delivering the mixture of air and water droplets to flow through an atomizing grill 28 for direction into the throat area T. A return line 30 is provided to return condensate from the first conduit 26a, with return line 30 draining from the lower portion 35 of auxiliary chamber 31. As shown in FIG. 3, the mixture of air and water droplets follows a substantially U-shaped path within the upper portion 33 of auxiliary chamber 31, exiting from first conduit 26a and entering second conduit 26b.

Figure 4:
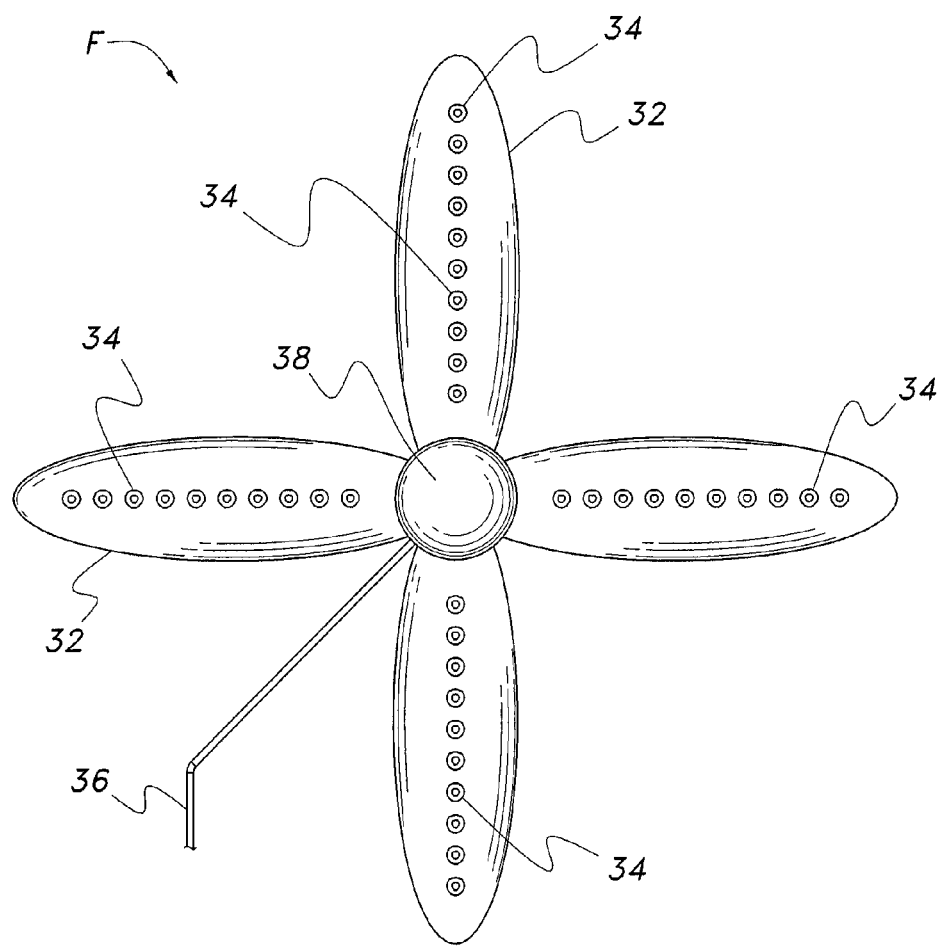
FIG. 4 is a diagrammatic front view of an alternative system used in delivery of cooling water to the solar-powered air conditioning system of FIG. 1.

In a second embodiment of a water delivery system, shown in FIG. 4, a fan, generally indicated at F, is provided with hollow fan blades 32. A plurality of atomizing nozzles 34 is formed directly in the blades 32. Water is provided via line 36 to a hollow fan hub 38 for distribution into the hollow fan blades 32. Water droplets exit the nozzles 34 into the airstream generated by the blades 32. The fan F is disposed to direct the airstream and water droplets through the roof 12 of the structure 10 at the throat area T.

It is to be understood that the present invention is not limited to the embodiments described above, but encompasses any and all embodiments within the scope of the following claims.

We claim:

1. A solar-powered air conditioning system, comprising:
   a structure having at least one wall and a roof of hyperbolic, paraboloid configuration defining a convergent-divergent profile, the roof having an outer surface, the structure being adapted for erection at ground level;
   a throat area defined at a portion of the structure where the roof is closest to the ground;
   a plurality of solar panels positioned on the outer surface of the roof for generating electrical energy;
   an evaporative air conditioning system powered by the solar panels for cooling the structure, wherein said evaporative air conditioning system comprises:
      a reservoir for containing a water supply;
      a solar-powered fan for supplying ambient air to the reservoir and increasing evaporation from the reservoir to entrain water droplets in a stream of air;
      an auxiliary chamber having an upper portion and a lower portion;
      a first conduit for transferring the stream of air with the entrained water droplets from the reservoir to the upper portion of the auxiliary chamber; and
      a second conduit having an atomizer grill for directing the stream of air with the entrained water droplets from the upper portion of the auxiliary chamber to said throat area, wherein the stream of air with the entrained water droplets travels along a substantially U-shaped path within the upper portion of the auxiliary chamber between the first and second conduits.

2. The solar-powered air conditioning system according to claim 1, wherein said roof is inflatable.

3. The solar-powered air conditioning system according to claim 1, wherein said roof is fabricated from functionally graded material providing thermal insulation.

4. A structure for enclosing an open ground area, comprising:
   at least one wall and an inflatable roof of hyperbolic, paraboloid configuration mounted on the at least one wall to define the structure, the roof being fabricated from functionally graded material providing thermal insulation and defining a convergent-divergent profile, the roof having an outer surface;
   a throat area defined at a portion of the structure where the roof is closest to the ground;
   a plurality of solar panels positioned on the outer surface of the roof for generating electrical energy;
   an evaporative air conditioning system powered by the solar panels for cooling the structure, wherein said evaporative air conditioning system comprises:
      a reservoir for containing a water supply;
      a solar-powered fan for supplying ambient air to the reservoir and increasing evaporation from the reservoir to entrain water droplets in a stream of air;
      an auxiliary chamber having an upper portion and a lower portion;
      a first conduit for transferring the stream of air with the entrained water droplets from the reservoir to the upper portion of the auxiliary chamber; and
      a second conduit having an atomizer grill for directing the stream of air with the entrained water droplets from the upper portion of the auxiliary chamber to said throat area, wherein the stream of air with the entrained water droplets travels along a substantially U-shaped path within the upper portion of the auxiliary chamber between the first and second conduits.

* * * * *